Oct. 12, 1965 M. KNOBEL 3,210,988
AIR GAGE NOZZLE
Filed May 17, 1963
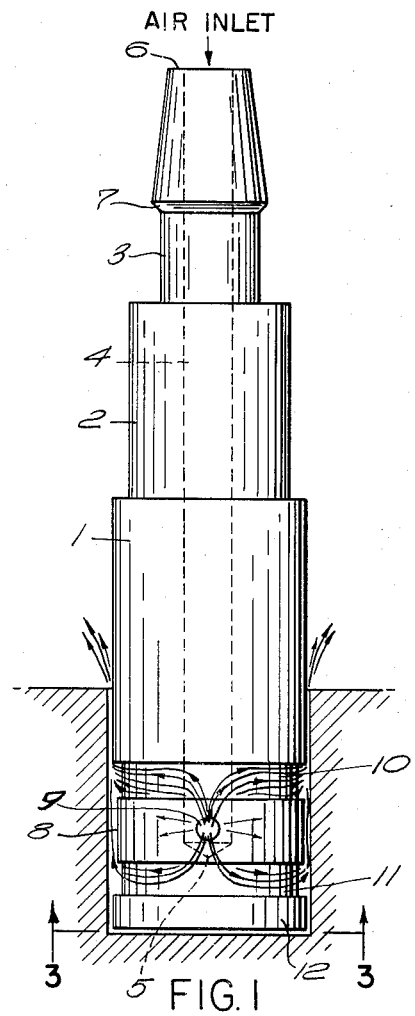
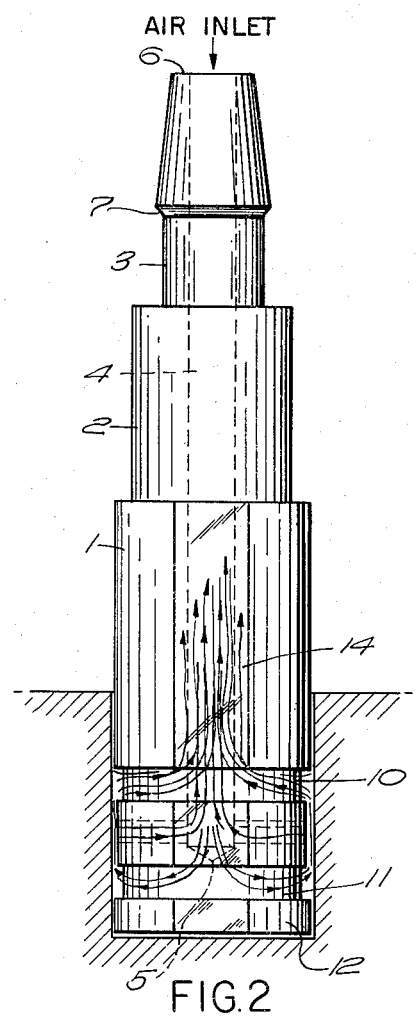
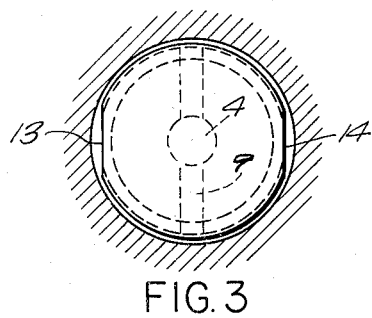
INVENTOR.
MAX KNOBEL
BY
*Blair & Buckles*
ATTORNEYS

United States Patent Office 3,210,988
Patented Oct. 12, 1965

3,210,988
AIR GAGE NOZZLE
Max Knobel, 663 Beacon St., Boston, Mass.
Filed May 17, 1963, Ser. No. 281,236
2 Claims. (Cl. 73—37.9)

This invention relates to an air gage nozzle and more particularly to an air gage nozzle for measuring the inside dimensions of work bores or holes of both the through- and closed-end type. The instant nozzle may be used, for example, to gage work bore diameters or hole areas as well as other critical inside dimensions. In some respects it improves upon the apparatus of my Patent No. 2,692,498, dated October 26, 1954, entitled Air Gauge.

The conventional air gage nozzle of the type with which this invention is concerned is suppled with air from a restricted passage connected to a suitable source of air under relatively high pressure. A pressure gage is connected in the passage between the nozzle and the restriction for indicating the pressure in the passage. The gaging nozzle is inserted into the hole or bore to be measured and the pressure indicated at the gage is then a function of the distance between the nozzle air discharge orifice and the side wall of the hole or bore.

The main purpose of an air gage nozzle is of course to reflect accurately the distance between the nozzle orifice and the bore wall by sensing only the back pressure produced by said wall. In this important respect, gaging nozzles heretofore have not been entirely satisfactory in use because they have not been able to rapidly and smoothly convey the air exhausting through the nozzle orifices out of the bore being gaged. Resultantly, eddies of air formed in the region between the nozzle and the bore wall causing a build-up in back-pressure at the nozzle over and above that desirably produced by the bore wall causing in turn a false indication of the bore dimension at the gage for which compensation or correction had to be provided. This back-pressure build-up became greater with increasing bore depth, and was particularly troublesome when gaging work bores of the closed-end type.

In addition, conventional air gage nozzles have been disadvantaged in being quite difficult and costly to manufacture, in that they required several accurate milling operations to form the longitudinal air exhaust grooves and flat sections found on their outside surface. Further their shape made it difficult even to measure and thereby to make copies of these prior devices.

Accordingly my invention aims to provide an improved air gage nozzle for measuring inside dimensions accurately and efficiently and with substantially no build-up in back-pressure.

A second object of this invention is to provide an air gage nozzle which can be made and reproduced easily and inexpensively such as by a simple turning operation. With my invention also scoring and scratching of the nozzle or the work when the nozzle is inserted into or removed from the work bore are prevented because an air cushion is provided all around the circumference of the nozzle.

In the accompanying drawing:

FIG. 1 is an elevation view of an air gage nozzle embodying the features of my invention and shown as inserted into a closed-end work bore, the flow lines indicating the escape path of the air discharging through the nozzle orifices;

FIG. 2 is a view generally similar to FIG. 1 but with the nozzle rotated through a 90° angle; and FIG. 3 is an end view along line 3—3 of FIG. 1, but without the flow lines.

Referring to the drawing, my air gage nozzle is shown as inserted into a work bore such as that found, for example, in a closed hole plug. The illustrated nozzle is almost 2 inches long and comprises a generally cylindrical main casing section 1, a smaller diameter integral waist section 2 and a still smaller diameter integral tail section 3. The nozzle is provided with a central conduit or bore 4 running lengthwise from a point 5 adjacent the free or forward end of casing section 1 to the free or rear end 6 of tail section 3, said free ends being herein sometimes referred to as the inner end and the outer end respectively of the device or air gage nozzle as a whole. Nozzle end 6 is adapted to be connected to a suitable hose (not shown) running from a source of compressed air and supplying air at a relatively high pressure, say about 30 p.s.i. Tail section 3 is provided with an all-around flange 7 midway along its length and is inwardly tapered from flange 7 toward its free end 6 to facilitate said connection and to insure an air-tight fit between tail section 3 and the hose.

In accordance with the invention the major diameter casing section 1 has a reduced diameter portion 8 located adjacent the forward end thereof and extending a short distance, say about ⅛ inch along the length thereof. The diameter difference between the casing 1 and portion 8 is a matter of a few thousandths of an inch and determines in part the sensitivity of the gage. A smaller difference results in higher sensitivity. A pair of diametrically opposite transverse air discharge orifices 9 are provided in reduced diameter portion 8. Orifices 9 communicate with central conduit 4 and provide an escape for the air introduced into the nozzle through the air inlet at 6. As best seen in FIGS. 1 and 2 of the drawing, the exhausting air is free to flow all around the circumference of the nozzle in the space between casing portion 8 and the wall of the work bore.

Further under the invention, means are provided for controlling the air discharging from orifices 9 into the region between the nozzle and the work bore wall such that the air is conveyed out of the bore in smoothly flowing streams and such that substantially no eddy currents form in the work bore. The means are shown in the illustrated embodiment to comprise more particularly a pair of similar circumferential air control channels or grooves 10, 11 disposed on opposite sides of orifices 9 at the opposite edges of reduced diameter casing portion 8. The bottom or inside diameter of grooves 10, 11 is appreciably smaller than the diameter of casing portion 8. The depth of grooves 10, 11 is not critical as long as they are appreciably deeper than portion 8, about ¼₂ inch being enough. The size and location of groove 10 is such as to leave a casing portion 12 of full diameter at the forward end of the nozzle which together with the remaining full diameter part of casing section 1 insure proper axial alignment of the nozzle and the work bore.

The exhausting air escapes from channels 10, 11 out of the work bore along paths formed by a pair of flat longitudinal casing portions 13, 14 running the full length of casing section 1. The flat portions 13, 14 are formed by grinding or slabbing off the sides of casing section 1, including portion 12, to a depth below the surface of reduced diameter casing portion 8 but above the bottom wall of grooves 10, 11. Noting particularly FIG. 3, said flats 13, 14 as viewed endwise of the nozzle each present a transversely continuous chordal plane extending flatwise entirely across the otherwise full-diameter cylindrical portions 1, 12. The longitudinal edges of said single-planar flats 13, 14 intersect the cylindrical outer wall of said nozzle portions and coincide with that wall. Thus the slices of material removed and the transversely continuous longitudinal path defining spaces formed thereby are full geometrical segments cross-sectionally, wholly open across the right chordal base lines of the flats and the subtended arcs thereof. Although the nozzle will work satisfactorily with the slabbed-off casing portions or flats 13, 14 coinciding with the orifices 9, most desirably for better air flow said flats 13, 14 should be located away from the orifices 9 about 90° around the circumference of the nozzle, or so that the flat portions 13, 14 will lie as far away as possible from the streams of air discharging directly from orifices 9.

As best seen in FIGS. 1 and 2, in the case of a closed-end work bore the aforementioned nozzle configuration causes the air discharging through orifices 9 to divide into a plurality of separate smoothly flowing paths or streams. The air from each orifice 9 divides into a main air stream flowing upward into the channel nearest the entrance to the bore, herein channel 10, where the stream splits into two smaller air streams flowing in opposite directions along the channel. The two streams from each nozzle merge at and travel out to the atmosphere through the vertical passages formed between the slabbed-off casing portions 13, 14 and the side wall of the work bore. Some of the air from each orifice forms a second smaller air stream flowing downwardly into channel 11. This stream splits into two parts flowing in opposite directions along the channel 11. These parts merge at the bottoms of and then flow vertically upward through the flattened casing portions 13, 14 where they merge gradually and smoothly with the air streams coming from channel 10.

A certain amount of air flows also in opposite directions in the small region between reduced diameter casing portion 8 and the wall of the work bore. However, it will be understood that these air streams are substantially smaller than those found in channels 10, 11 and are sucked or drawn along by and parallel to the larger streams so that substantially no eddies are allowed to subsist in the region adjacent said reduced diameter casing portion. The described efficient escape paths afforded the air exhausting from orifices 9 result in there being substantially no build-up in back-pressure within the bore so that the pressure communicated to the gage remains independent of the depth of the bore and reflects only the distance between the nozzle orifices and the bore wall.

Although the aforementioned discussion has been confined to the instant nozzle as it operates in a closed-end bore, the same efficient air escape paths are provided when the same nozzle is used to gage an open-ended hole. In this event, however, the major air stream would flow through channel 11 instead of channel 10 and thence to the forward end of the flat portions 13, 14 extending downwardly along adjacent major diameter casing end portion 12, these being the paths of least resistance. A smaller amount of air would of course flow along channel 10 and upwardly along portions 13, 14 as described previously. In all cases, however, the separate escaping air streams are controlled so that they merge into one another gradually and smoothly on their way out of the bore.

Actually if the air gage nozzle is to be used exclusively for gaging holes or bores of the closed-end type only one, say the upper, channel need be provided to produce satisfactory results. However, where it is desirable to employ the same nozzle in both open- and closed-end holes, the hereinbefore described nozzle configuration including two air control channels 10, 11 is most practicable.

It will be appreciated also from the foregoing that the instant nozzle may be made easily and inexpensively by simply turning it out on a lathe and grinding the flats, and that the device is easily measured for reproduction purposes.

An added feature of this invention is that the above described nozzle configuration directs the escaping air all around the circumference of the nozzle so that when the nozzle is being inserted into or removed from a hole or bore the air forms a protective cushion all around the nozzle greatly reducing the likelihood of excessive wear and surface scoring.

My invention is not limited to the particular embodiments thereof illustrated and described herein, and I set forth its scope in my following claims:

1. An air gage nozzle for measuring inside dimensions of work bores and apertures, comprising:
    a generally cylindrical casing having a work-receivable inner end and an opposite air-pressure-connective outer end,
    said casing being of determined major diameter at the longitudinal portion thereof from the terminus of the inner end to approximately midlength and being of lesser diameter therebeyond to the outer end,
    said casing having adjacent the inner end in said major diameter portion a reduced diameter portion of a limited longitudinal extent sufficient to present and there having diametrically oppositely disposed transverse air discharge orifices,
    an air inletting conduit extending axially of the casing from said outer end thereof and into communication internally of the casing with said discharge orifices,
    a circumferential air-controlling groove formed in and extending continuously around the casing at least at one transverse edge of said reduced diameter portion,
    and longitudinal air escape paths along the full length of the outer wall of said major diameter longitudinal portion of the casing,
    said longitudinally extensive paths each being defined by a single-planar flat in a transversely continuous chordal plane having the longitudinal edges coincident with the cylindrical outer wall of said major diameter casing portion so as to afford for each said path a segmental cross-sectional form wholly open across the chordal base line thereof and the full arc subtended by it.

2. An air gage according to claim 1 wherein a circumferential air-controlling groove is provided continuously around both transverse edges of said reduced diameter casing portion, and said flats lie in planes radially inward of said reduced diameter portion but radially outward of the bottoms of said grooves and have the longitudinal center lines thereof angularly offset 90° from the air discharge orifices of said reduced diameter casing portion.

References Cited by the Examiner

UNITED STATES PATENTS

| | | | |
|---|---|---|---|
| 2,457,401 | 12/48 | Rupley | 73—37.9 |
| 2,706,339 | 4/55 | Aller. | |
| 2,746,287 | 5/56 | Tinker | 73—37.9 |
| 2,779,188 | 1/57 | Meyer. | |

ISAAC LISANN, *Primary Examiner.*